United States Patent
Cardona et al.

(10) Patent No.: US 9,442,812 B2
(45) Date of Patent: *Sep. 13, 2016

(54) PRIMING FAILOVER OF STATEFUL OFFLOAD ADAPTERS

(71) Applicant: International Business Machines Corporation, Armonk, NY (US)

(72) Inventors: Omar Cardona, Cedar Park, TX (US); Matthew R. Ochs, Austin, TX (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/303,720

(22) Filed: Jun. 13, 2014

(65) Prior Publication Data

US 2015/0169416 A1    Jun. 18, 2015

Related U.S. Application Data

(63) Continuation of application No. 14/103,937, filed on Dec. 12, 2013.

(51) Int. Cl.
*G06F 11/00* (2006.01)
*G06F 11/20* (2006.01)
*G06F 15/173* (2006.01)
*G06F 11/16* (2006.01)

(52) U.S. Cl.
CPC ......... *G06F 11/203* (2013.01); *G06F 11/1658* (2013.01); *G06F 11/2005* (2013.01); *G06F 11/2033* (2013.01); *G06F 15/17331* (2013.01)

(58) Field of Classification Search
CPC ............ G06F 11/203; G06F 11/2033; G06F 15/17331; G06F 16/17331
See application file for complete search history.

(56) References Cited

U.S. PATENT DOCUMENTS

| | | | |
|---|---|---|---|
| 6,327,243 B1 | 12/2001 | Gregorat | |
| 7,275,175 B2 | 9/2007 | Cardona et al. | |
| 8,305,879 B2 | 11/2012 | Gregg | |
| 8,880,935 B2 | 11/2014 | Fox et al. | |
| 2006/0020854 A1 | 1/2006 | Cardona et al. | |
| 2008/0109526 A1 | 5/2008 | Subramanian et al. | |
| 2009/0158082 A1 | 6/2009 | Jain et al. | |

(Continued)

OTHER PUBLICATIONS

U.S. Appl. No. 14/103,937.

(Continued)

*Primary Examiner* — Philip Guyton
(74) *Attorney, Agent, or Firm* — Stephen J. Walder, Jr.; Thomas E. Tyson

(57) ABSTRACT

Mechanisms, in a data processing system comprising a first adapter and second adapter, for performing a failover operation from the first adapter to the second adapter are provided. The mechanisms detect that an imminent failure of the first adapter is likely to occur and initiate a failover priming operation in the first adapter and second adapter in response to detecting the imminent failure. The failover priming operation configures ingress and egress buffers of the second adapter to have a similar configuration to ingress and egress buffers of the first adapter. The mechanisms migrate processing of ingress data traffic to the second adapter prior to failure of the first adapter such that the first adapter processes egress data traffic from the data processing system and the second adapter processes ingress data traffic to the data processing system.

10 Claims, 4 Drawing Sheets

(56) References Cited

U.S. PATENT DOCUMENTS

| | | |
|---|---|---|
| 2010/0318666 A1 | 12/2010 | Gallagher et al. |
| 2011/0167293 A1 | 7/2011 | Cabezas et al. |
| 2011/0320861 A1 | 12/2011 | Bayer et al. |
| 2013/0179732 A1 | 7/2013 | Alanis et al. |
| 2015/0169416 A1* | 6/2015 | Cardona ............. G06F 11/2033 714/4.12 |
| 2015/0169418 A1* | 6/2015 | Cardona ............. G06F 11/2033 714/4.11 |

OTHER PUBLICATIONS

"InfiniBand Clustering", Mellanox Technologies Inc., White Paper, Document No. 2271GI, Accessed on Sep. 12, 2013, pp. 1-8.

* cited by examiner

PRIMING FAILOVER OF STATEFUL OFFLOAD ADAPTERS

This application is a continuation of application Ser. No. 14/103,937, filed Dec. 12, 2013, status pending.

BACKGROUND

The present application relates generally to an improved data processing apparatus and method and more specifically to mechanisms for priming failover capabilities for low latency stateful offload communication adapters.

Modern communication adapters, e.g., network adapters, input/output (I/O) adapters, and the like, provide hardware based stateful offload for low latency communication using protocols such as Remote Direct Memory Access (RDMA). Stateful offload refers to the ability to offload some of the processing typically performed by the host computing system to the communication adapter. For example, the Transmission Control Protocol (TCP) offload engine (TOE) is one example of a stateful offload engine of a communication adapter and is a technology used in network interface cards (NICs) to offload processing of the entire TCP/IP stack to the network controller of the NIC. RDMA is a direct memory access from the memory of one computing device into that of another without involving either computing device's operating system.

When communication adapters that perform stateful offload operations experience an outage in the switch fabric coupling the adapter to the host system, the offloaded state in the adapter is lost to the host system. This makes it difficult to provide high availability solutions with transparent failover for such stateful adapters without application outage.

Known mechanisms attempt to address this issue by utilizing a mechanism referred to as Automatic Path Migration (APM). APM mechanisms operate internal to an adapter and attempt to automatically find an alternative path from the adapter, such as via another physical port of the adapter, to the network when a failure of a communication connection is detected. However, APM mechanisms are limited to finding alternate paths to the switch fabric available via the same adapter or host channel adapter (HCA), i.e. via another physical port of the same adapter/HCA. Thus, the APM mechanisms cannot provide an alternate path when all the ports of an adapter or HCA suffer an outage.

SUMMARY

In one illustrative embodiment, a method, in a data processing system comprising a first adapter and second adapter, for performing a failover operation from the first adapter to the second adapter. The method comprises detecting that an imminent failure of the first adapter is likely to occur. The method further comprises initiating a failover priming operation in the first adapter and second adapter in response to detecting imminent failure. The failover priming operation configures ingress and egress buffers of the second adapter to have a similar configuration to ingress and egress buffers of the first adapter. Moreover, the method comprises migrating processing of ingress data traffic to the second adapter prior to failure of the first adapter such that the first adapter processes egress data traffic from the data processing system and the second adapter processes ingress data traffic to the data processing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, he following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
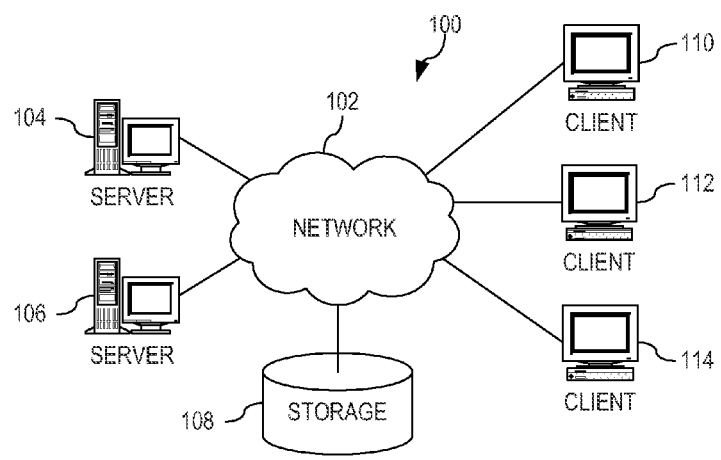
FIG. 1 depicts a pictorial representation of an example distributed data processing system in which aspects of the illustrative embodiments may be implemented.

Modern input/output (IO) technologies such as Remote Direct Memory Access (RDMA) make use of IO adapters that are fully stateful offload capable IO adapters. As mentioned above, RDMA is a functionality that allows direct memory access from the memory of one computer into that of another computer, computing device (such as an IO adapter), or the like, without involving either computer's operating system. RDMA facilitates high throughput, low-latency networking, which is especially useful in massively parallel computer clusters.

RDMA supports zero-copy networking by enabling the network adapter of a computer to transfer data directly to or from application memory, thereby eliminating the need to copy data between the application memory and the data buffers in the operating system. Such direct transfers of data do not require any work to be done by the processors, cache memories, or the like, and do not require context switches. Such direct transfers may be performed in parallel with other system operations that the computers are performing. For example, when an application performs a RDMA Read or Write request, the application data is delivered directly to the network via a RDMA enabled network adapter, reducing the latency of the transfer.

Many modern architectures and specifications are designed with RDMA and RDMA enabled network adapters in mind. For example, the InfiniBand™ specification maintained and furthered by the InfiniBand™ Trade Association (IBTA), and InfiniBand™ architectures developed by International Business Machines Corporation of Armonk, N.Y., provide support for RDMA operations to be performed via the InfiniBand™ fabric. Similarly, the Open Fabrics Enterprise Distribution (OFED™) specification and architecture, maintained and furthered by the Open Fabrics Alliance (OFA), and which is built upon the InfiniBand™ specification, also provides support for RDMA operations. These architectures provide various different structures for performing RDMA operations and IO communication including Queue Pairs (QPs), comprising transmit and receive Work Queues (WQs), Completion Queues (CQs), and Event Queues (EQs). More information about InfiniBand™ and OFED™ may be obtained from the IBTA and OFA organizations and corresponding websites. The following description of the illustrative embodiments will assume an architecture of the type specified in the OFED™ specification, in which queue structures are used to facilitate IO operations, including RDMA operations. However, it should be appreciated that the illustrative embodiments are not limited to such. Rather, the illustrative embodiments may be employed in any architecture that utilizes a stateful offload IO model such that IO state/context information is maintained at the IO adapter hardware rather than the operating system level and may be lost in the event of an error occurring.

That is, while stateful offload IO models provide high performance IO with minimal overhead costs, they are inherently difficult to maintain since the states/contexts describing the status and behavior of an IO connection (i.e. OSI layers 3-4) are abstracted from the operating system and resident on the adapter hardware. This is especially true when the adapter hardware fails. Since the states/contexts are resident on the adapter hardware, if the adapter hardware fails, this state/context information is lost. Even if the connection can be rebuilt on another adapter associated with the host system, there is a noticeable time in which application and connection are not available while the connection is being rebuilt on the new adapter hardware.

Failover mechanisms for failing over from one adapter to another have been developed by International Business Machines Corporation for assisting in performing failover operations from one adapter to another. One such system is described in commonly assigned U.S. Patent Application Publication 2010/0318666 entitled "Expediting Adapter Failover." With the mechanism of 2010/0318666, detect logic is provided for detecting when an adapter has experienced an anomaly and is about to fail. The mechanism of 2010/031866 then determines if a system bus is still operational and if so, copies the adapter memory over to a standby adapter using direct memory access (DMA) operations. Thus, the state and connection information for the connections being serviced by the primary adapter is not lost and instead is copied to the standby adapter.

The illustrative embodiments enhance and improve upon such failover mechanisms, the 2010/0318666 mechanism being one example, by providing mechanisms for priming the standby adapter either prior to, or in response to, detection of an imminent failure of the primary adapter. The illustrative embodiments prime the standby adapter by performing operations on both the primary and standby adapter, without interaction by the host system, to setup resources on the standby adapter for handling ingress and egress traffic prior to the resources actually being used for these purposes. The illustrative embodiments then further prime the standby adapter by gradually migrating the ingress and egress traffic handling to the standby adapter based on the continued health of the primary adapter and determinations of stable "cutover" states at which failover can occur. For example, in one illustrative embodiment, the standby adapter is permitted to handle ingress traffic while the primary adapter, if still operating in a healthy state, may continue to handle the egress traffic. The egress traffic may then be migrated in response to the primary adapter actually failing or the state of the primary adapter continuing to deteriorate towards complete failure of the primary adapter. As a result, the failover from the primary adapter to the standby adapter is seamless and there is no noticeable failover from the primary adapter to the standby adapter.

With the mechanisms of the illustrative embodiments, the primary and secondary adapters are configured with information about one another such that failover from the primary adapter to the secondary adapter is made possible. Thereafter, in response to a detection of an imminent failure of the primary adapter, such as by detecting a deterioration in the performance of the primary adapter, information required to construct a view of the ingress and egress direct memory access (DMA) queues on the standby adapter is copied over from the primary adapter to the standby adapter. The copied information is used to setup DMA queues and other associated resources on the standby adapter. Ingress traffic on the primary adapter is paused and a size of data currently stored in the ingress buffer of the primary adapter, but not yet written to host memory, is determined. The size of the data in the ingress buffer of the primary adapter is used to calculate a skip position in the ingress DMA queue. Thereafter, DMA transactions between the ingress queue and the host memory are enabled so as to continue the draining of the remaining ingress data in the ingress buffer down to the previously determined skip position.

The calculated skip position of the ingress DMA queue is communicated to the standby adapter to thereby program the ingress queue current position on the standby adapter. Once programmed, ingress traffic is enabled on the standby adapter by enabling the ingress function on the standby adapter. Ingress traffic on the standby adapter will now be written to host memory, beginning at the programmed skip position in the ingress DMA queue. The enablement of the ingress function on the standby adapter is done in parallel with the draining of ingress data in the primary adapter's ingress buffer. Interrupts are not enabled on the standby adapter however, so as to keep the host system from processing ingress data on the standby adapter until the ingress data in the ingress buffer of the primary adapter has been drained.

The standby adapter then enables its ingress DMA queue and PHY, i.e. a hardware element implementing the physical layer of the OSI model and which connects a link layer device (the adapter) to a physical medium, e.g., optical fiber, copper wire, Ethernet connector, or the like. At this point, ingress data is received over the failover adapter and written to the host memory while egress data continues to be transmitted from the host system via the primary adapter. Thus, new ingress data is being received through the standby adapter, old ingress data already present in the ingress buffer of the primary adapter down to a cutover point is transferred by DMA between the ingress buffer of the primary adapter to the host memory, and egress data is transmitted by the primary adapter. This state continues until all of the old ingress data present in the ingress buffer, down to the determined cutover point, is drained from the ingress buffer of the primary adapter to the host memory.

Once all of the old ingress data present in the ingress buffer is drained, interrupts on the standby adapter are enabled and an interrupt is generated to the host system if one has not already been generated. A determination is made as to whether the primary adapter is flowing egress data by evaluating completion counts of the primary adapter, where increasing completion counts indicate that egress data is flowing, assuming that the physical link is still operational on the primary adapter (this may be bypassed if the physical link is not operational on the primary adapter). If egress data is determined to be flowing and the health of the egress side is good, then split handling of ingress and egress data flows by the primary and standby adapter may be continued until such time that the primary adapter is determined to be approaching failure again, e.g., performance of the primary adapter continues to deteriorate, or failure of the primary adapter happens.

Alternatively, if egress data is flowing through the primary adapter, the egress DMA transactions may be paused on the primary adapter and the current position in the egress DMA queue may be communicated to the standby adapter. In such a case, the egress function on the standby adapter is enabled to begin reading in data to its local egress buffer but not yet send to the standby adapter's PHY. The primary adapter's egress buffer is then drained by sending the data out to the PHY (this may be performed in parallel with the operations for pausing the DMA transactions between the host memory and the egress buffer of the primary adapter and the enabling of the egress function on the standby adapter). The egress PHY of the standby adapter is then enabled such that egress data is now flowing from the host memory through the standby adapter. The host system is then informed that the failover from the primary adapter to the standby adapter has been completed and the primary adapter can be taken offline.

If egress data is not flowing through the primary adapter, a backtrack offset in the egress DMA queue relative to unsent data sitting in the egress buffer is derived. The backtrack offset is communicated to the standby adapter and programmed as the current position in the egress DMA queue. Following successful programming of the current position in the egress DMA queue, the egress function on the standby adapter is then fully enabled. Thereafter, the host system is informed that the failover from the primary adapter to the standby adapter is completed.

Thus, with the mechanisms of the illustrative embodiments, when a connectivity failure error occurs between a primary adapter and a switch in a switch fabric, rather than having to tear down the connection, thereby losing state information, the illustrative embodiments may failover to a secondary standby adapter with the state and data being transferred from the primary adapter to the standby adapter. Hence state information in a stateful offload engine of the primary adapter is not lost when a connectivity failure occurs. As a result, the failover is seamless to the user processes in the userspace aside from a short time when host system IO is paused while the state and data is being transferred from the primary adapter to the secondary adapter.

The mechanisms of the illustrative embodiments solve the limitations of Automatic Path Migration (APM) by providing a failover from one adapter to another connected to the same switch or otherwise accessible via the same switch, rather than being limited to only failover from one path to another within the same adapter as is the case with APM. The illustrative embodiments, however, may be utilized in conjunction with APM where, for example, APM mechanisms may be attempted first within the primary adapter and, if APM is not successful for solving the problem associated with the error, the mechanisms of the illustrative embodiments for detection and failover to another adapter may be utilized.

Moreover, with the improved mechanisms of the illustrative embodiments, not only is failover from a primary adapter to a standby adapter enabled in response to the detection of an imminent failure of the primary adapter, but such is made possible in a manner that minimizes any perceived interruption of the processing of ingress and egress traffic through the primary adapter. This is achieved by gradually migrating the ingress and egress traffic over from the primary adapter to the secondary adapter. In addition, if the primary adapter does not actually fail, or if the primary adapter's performance does not continue to deteriorate, then a split handling of ingress and egress traffic between the primary adapter and the failover adapter is allowed to continue. From an external perspective, there is no perceived delay time due to the failover from the primary to secondary adapter.

With regard to the re-routing of egress data from the primary adapter to the secondary or standby adapter, it should be appreciated that data resides in the DMA queue in host memory, which is mapped to the bus fabric. The DMA space where the DMA buffer data resides may be a single, contiguous space from which each individual entry is known to the adapters via a specified or prescribed address and size. Alternatively, it may be the case that the DMA functions are split between a control space and a DMA buffer space wherein mapped buffers are referenced (via a bus address) in each entry in the control space. Therefore, the secondary adapter is made aware of the DMA buffers either directly or indirectly via the bus mapping or the buffer mapping. Routing of egress traffic from the DMA queue in host memory to the egress buffer of the adapter is achieved via these mappings and bus mechanisms.

With regard to redirecting ingress traffic from the primary adapter to the secondary or standby adapter, such redirection is achieved by exchanging network address information between the primary and secondary adapters during the configuration of the adapters or initiation of the failover priming operation. During the priming of the failover operation with regard to the ingress traffic flow, the PHY of the secondary adapter is programmed to use the same network address as that of the primary adapter such that the ingress traffic is re-routed to the secondary or standby adapter via standard network routing practices and techniques.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
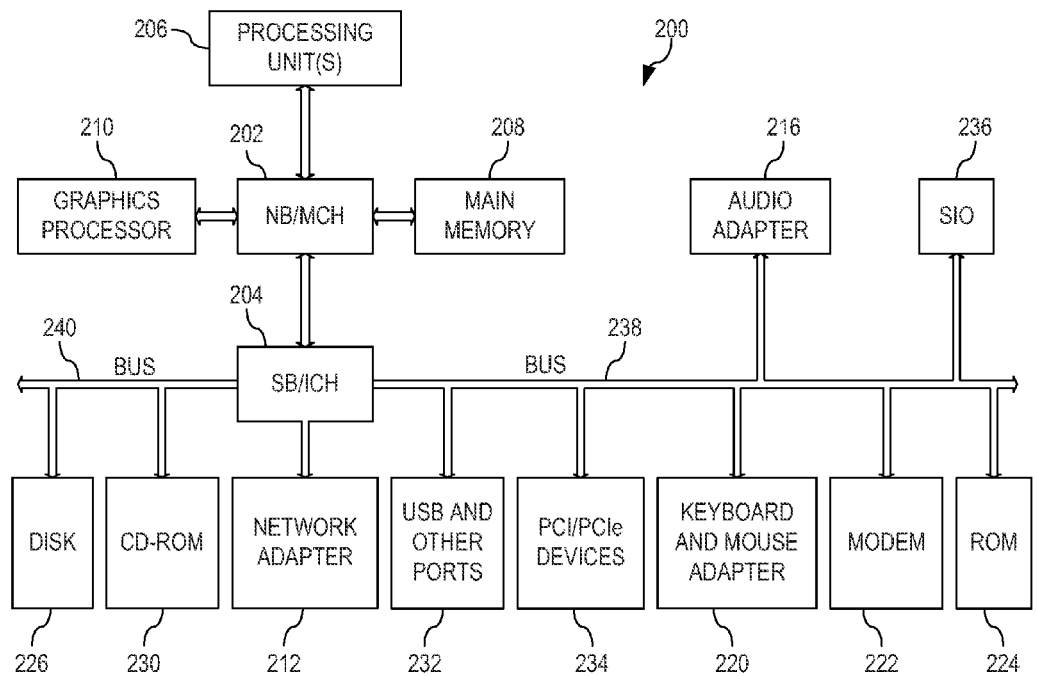
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In accordance with the illustrative embodiments, one or more of the computing devices in FIG. 1, e.g., servers 104, 106 or clients 110-114, comprise network adapters implementing hardware/software logic for performing failover operations for failing over from a primary adapter to a secondary or standby adapter in the case of an imminent failure of the primary adapter being detected. In addition, the network adapters further comprise hardware/software logic for priming the secondary or standby adapter for preparing to handle ingress and egress traffic for the primary adapter in the event of a failure of the primary adapter. For example, the network adapter 212 in FIG. 2 may in fact comprise a plurality of network adapters where at least one of the adapters is a primary adapter and at least one other adapter is a secondary or standby adapter, in accordance with the illustrative embodiments. The mechanisms and operation of these primary and secondary or standby adapters will be described hereafter with reference to the remaining figures.

Figure 3:
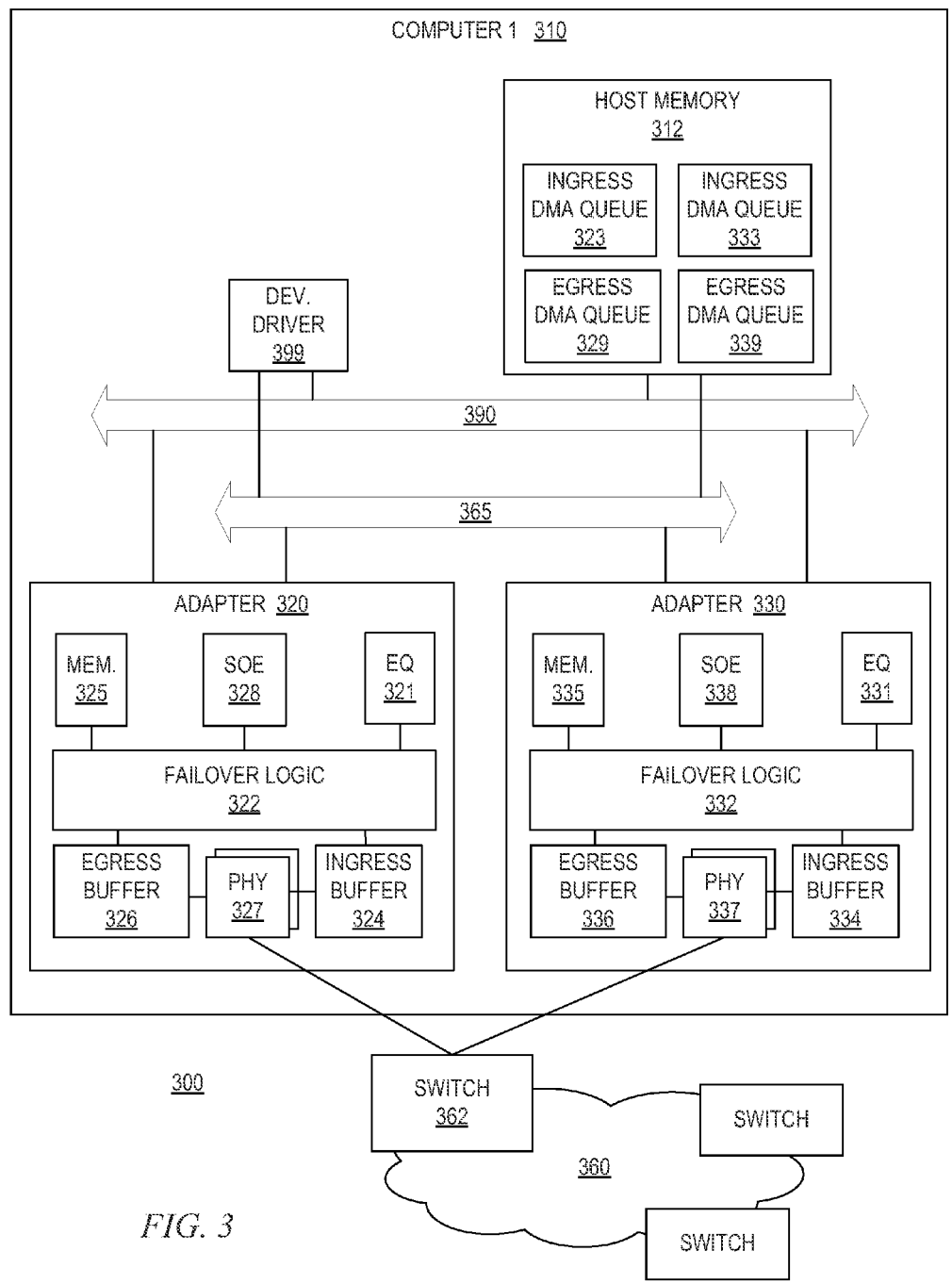
FIG. 3 illustrates an embodiment of a failover system comprising primary and secondary or standby adapters in accordance with one illustrative embodiment.

FIG. 3 illustrates an embodiment of a failover system 300 comprising primary and secondary or standby adapters in accordance with one illustrative embodiment. The failover system 300 may comprise a computer 310 having a primary adapter 320 and a secondary or standby adapter 330 which are coupled to a network 360 comprising a switch fabric. The computer 310 may be connected to other computing devices, storage devices, and the like, via the network 360 which may operate as any type of generally known data network, e.g., a TCP/IP network. That is, network 360 may comprise a local area network (LAN), a wide area network (WAN), a metropolitan area network (MAN), a combination thereof, or a combination of any other sizes or types of networks that facilitate communication of data between computers, e.g., the network 360 may be network 102 in FIG. 1.

As mentioned above, the computer 310 may include both a primary adapter 320 and a secondary or standby adapter 330, and may further include an input-output (IO) bus 365 and an IO bus 390. IO bus 365 and IO bus 390 may be redundant buses, primary and secondary buses, parallel buses, or different types of buses with distinct, primary functions. In one illustrative embodiment, IO bus 365 and IO bus 390 both connect to the primary adapter 320 and standby adapter 330 to facilitate failover.

It should be noted that the phrase "standby adapter" is used herein to describe the relationship of the adapters with the primary adapter 320 for the purposes of failover but such adapters may have a distinct, primary function until called upon to take over functionality of the primary adapter 320. Consequently, failover may proceed within a computer between the primary adapter 320 and the standby adapter 330 in which case the primary function of the standby adapter 330 may be superseded or discontinued in favor of the failover functionality of the standby adapter 330. In other illustrative embodiments, the standby adapter 330 may wait in an idle state until such time as failover, or at least priming of a failover in accordance with the illustrative embodiments, to the standby adapter 330 is performed. The present embodiment includes only two standby adapters, however, other embodiments may comprise any number of standby adapters within the computer 310.

The primary and standby adapters 320, 330 may be any network adapter, IO adapter, or the like, and may comprise an Ethernet adapter, iSCSI adapter, a Fibre Channel adapter, or the like. Thus, in some embodiments, the primary adapter 320 and the standby adapter 330 may comprise network adapters also termed NICs (network interface cards).

Connecting between a computer 310 and a network 360, these network adapters 320, 330 may transmit (egress) and receive (ingress) data via the network 360. To provide uninterrupted network services, the standby adapter 330 may monitor viability of the primary adapter 320, or the primary adapter 320 may perform self monitoring of its operational state, and the standby adapter 330 may instantaneously take over for the primary adapter 320 in response to an imminent failure of the primary adapter 320 being detected, or in response to an instruction or other indication to take over the role of the primary adapter 320, such as an indication that the primary adapter 320 will be disabled due to a scheduled or unexpected maintenance event.

In accordance with the illustrative embodiments, the adapters 320 and 330 comprise stateful offload engines, such as a TOE adapter (TCP/IP offload engine adapter). More specifically, a TOE adapter may offload an entire TCP/IP stack which is crucial to preserving efficacy of high performance networks such as a 10 Gigabit Ethernet network. The primary adapter 320 and standby adapters 330 each have associated memories 325, 335 for storing data for facilitating such offload functionality. In some embodiments, copying the primary adapter memory 325 of the failing primary adapter 320 to the standby adapter memory 335 of the standby adapter 330 may expedite TCP/IP offload adapter failover by preserving TCP/IP stack and connection information thus sustaining network integrity.

The primary adapter 320 may communicate data with the host memory 312 of the first computer 310 via the IO bus 365. In the event that the IO bus 365 fails, failover options may include failover to a standby adapter 330 on a different IO bus 390. In further embodiments, failover may take place on a different server such as a failover server. In other words, an IO bus problem may render a server unavailable in which case software may automatically begin using a standby server. For example, high performance systems may provide multiple servers in different locations with assigned functions to takeover in case of failure in a network thus creating a safety net of servers available to take over some or all the responsibilities of a failing server. For example, supporting a web site with two separate servers prevents users from detecting glitches because they are redirected from the primary website server to the standby server with another executing copy of the web site. With respect to failover pertaining to an adapter, the preferred design may provide failover to a standby adapter in the same server and on the same bus, thus utilizing DMA through the IO bus.

In accordance with the illustrative embodiments, the adapters 320 and 330 comprise failover logic 322, 332 for handling a failover from a primary adapter, e.g., adapter 320, to a secondary or standby adapter, e.g., 330. Each of the failover logic 322, 332 may comprise logic for operation as a primary adapter and a secondary adapter such that when a secondary adapter takes over for the primary adapter, and thus becomes the new primary adapter, it may continue operations for subsequent failovers as a primary adapter rather than a secondary or standby adapter.

With regard to the primary adapter, the failover logic 322, 332 operates to detect deteriorating performance of the primary adapter and initiating priming of secondary or standby adapters for a failover operation in response to the detected deteriorating performance. The specific mechanisms for detecting a deteriorating performance of a primary adapter may take many different forms depending upon the particular desired implementation. For example, monitoring link health, data flow rates, and error bits on the primary adapter with deteriorating performance being notified to the host system via an event queue, interrupt, or the like.

In addition, the failover logic 322, 332, operating with regard to a primary adapter, performs functions described hereafter for determining cutover or failover points in DMA queues, pausing ingress/egress traffic handling by the primary adapter, draining of adapter ingress/egress buffers, and other operations for facilitating a seamless transition of ingress/egress traffic handling from the primary adapter to the secondary or standby adapter.

With regard to standby adapter roles, the failover logic 322, 332 operates to prime local resources on the adapter to take over handling of ingress/egress traffic from the primary adapter. The priming of such local resources may comprise the setting up of local buffers, e.g., ingress buffer 334 and egress 336, to a state consistent with that of the primary adapter by configuring the buffers 334, 336 with information identifying the DMA queues 323, 329, 333, and/or 339, e.g., an address and length of the appropriate DMA queues 323, 329, 333, and/or 339 in host memory 312. The local buffers 324, 326, 334, and 336 may be local stores, such as a first-in-first-out (FIFO) queue for example, which is used as an intermediary holding location for data between the physical connection (PHY) and the corresponding DMA queue 323, 329, 333, or 339. For example, for an ingress data flow, data packets are received by the PHY 327 or 337 and stored in the corresponding ingress buffer 324, 334. At some point later, the data is then transferred to the corresponding ingress DMA queue 323, 333 in host memory 312 by performing DMA writes. The locations of this data in the DMA queues 323, 333 in host memory 312 may be referenced directly (via a location in the DMA queue) or indirectly (via a buffer (bus) address located within an entry in the DMA queue).

The failover logic 322, 332 may further operate to begin handling of ingress traffic while egress traffic is still being handled by the primary adapter. The failover logic 322, 332 of a primary adapter, e.g., adapter 320, works in conjunction with the failover logic 322, 332 a secondary or standby adapter, e.g., adapter 330, to facilitate the failover operations or split handling of ingress/egress traffic in accordance with the illustrative embodiments. As a result, the mechanisms of the illustrative embodiments provide a transparent transfer of the adapter state information to a secondary or standby adapter such that the state in the primary adapter is not lost when it loses its connectivity to its switch fabric, i.e. fails. Peer-to-Peer switching capabilities of a bus are utilized to exchange alternate path information between collaborating adapters, as well as the connection state information when an outage occurs. As a result, the mechanisms of the illustrative embodiments overcome the single adapter limitations of Automatic Path Migration (APM).

During a startup operation of a computing system, or in response to the addition of an adapter to an already running computing system, e.g., computer 310, host computing system software, e.g., an adapter device driver 399 or the like, identifies primary 320 and secondary adapters 330 coupled to the same switch of the network 360, e.g., Peripheral Component Interconnect Express (PCIE) switch, or accessible via a same switch. The host computing system software 390 communicates the routing identifier (e.g., PCI Routing ID (RID)) and address of a scratchpad/mailbox of the secondary adapter 330, 380 to the primary adapter firmware, such as via a Direct Memory Access (DMA) operation. The primary adapter firmware then sends a message containing the address information and scratchpad/mailbox information for the primary adapter 320 to the secondary adapter 330, such as via a handshake operation.

In response to the message from the primary adapter 320, the secondary adapter 330 provides addresses for its control and data buffers to be used as DMA targets once a failover, or priming for a failover, is initiated by the primary adapter 320 or one of the secondary adapters 330. At this stage, both the primary 320 and secondary adapter 330 have a path to reach the other adapter over the bus, e.g. bus 365 and/or 390, of the host system 310 or the network 360, as well as being informed of their primary and secondary roles through configuration parameters.

During normal operation, the primary adapter 320 continues to service data communications between the host system 310 and the network 360 with the secondary adapter 330 remaining as a standby or failover adapter in the case of a failure of the connections from the primary adapter 320 to the switch fabric of the network 360. However, should an imminent failure of connectivity of the primary adapter 320 be detected at some point during operation of the primary adapter 320, a priming operation and/or failover operation may be performed to prime the secondary or standby adapter 330 for performing the failover from the primary adapter 320 to the secondary adapter 330 using the communication path established between the adapters 320, 330 determined during the setup operation. The failover operation provides a seamless transition from the primary adapter 320 to the secondary adapter 330 without losing the state information maintained on the primary adapter 320.

With regard to detecting imminent failure of the primary adapter 320, this imminent failure may be detected by detecting, for example, a connectivity failure of the primary adapter 320. The connectivity failure may be detected by the primary adapter 320 detecting a loss of switch connectivity either through a physical link loss or timeouts in the stateful offload engine (SOE) 328 of the primary adapter 320. This failure may affect multiple physical ports, or PHYs, 327 of the primary adapter requiring an identification of an alternate path through another communication adapter coupled to the same switch or accessible via the same switch.

In other illustrative embodiments, imminent failure of the primary adapter 320 may be detected by monitoring various performance characteristics of the primary adapter and determining if changes in the performance characteristics are indicative of an imminent failure. For example, if the performance characteristic, when compared to a predetermined criteria, indicates that the performance characteristics is not within normal operating ranges, then it may be determined that the primary adapter 320 is failing. The performance characteristic may be any characteristic indicative of the primary adapter 320's ability to handle communication data processing over one or more communication links through the primary adapter 320, e.g., link health characteristics, data flow rates, error bits, dropped packets, or the like.

Alternatively, imminent failure of the primary adapter 320 may be detected by the standby adapter 330 whose failure logic may monitor the health of the primary adapter 320. Such monitoring may again take many different forms depending upon the implementation. In one illustrative embodiment, the monitoring of the primary adapter 320 by a standby adapter 330 may be by way of heartbeat signals exchanged between the adapters 320, 330.

In response to detecting an imminent failure of the primary adapter 320, the primary adapter 320 failure logic 322, which may be implemented in hardware, firmware, or the like, sends an initiate failover message to the secondary adapter 330 over the bus IO bus 365. Alternatively, a DMA operation may be performed to DMA an initiate-failover value to a DMA messaging queue (not shown) that is set up dynamically at this time. In an embodiment where the secondary adapter 330 monitors the health of the primary adapter 320, the initiation of the failover may be made by the failover logic 332 of the secondary adapter 330 rather than the primary adapter 320. The primary adapter 320 failover logic 322 awaits a response from the secondary adapter 330 indicating that the secondary adapter 330 received the initiate failover message and has a link to the switch that can be utilized for failover from the primary adapter 320 to the secondary adapter 330.

In response to detecting the imminent failure of the primary adapter 320, and the sending of the initiate failover message to the secondary adapter 330, information required to construct a consistent view of the ingress DMA queue 323 and egress DMA queue 329 of the primary adapter 320 on the secondary adapter 330 is copied over to the secondary adapter 330 by the failover logic 322 of the primary adapter 320. This is done without intervention by the host system 310, e.g., the operating system of the host system 310, and is done so that the secondary adapter 330 knows how to set up its own resources, e.g., local buffers 334, 336, and state to mirror that of the primary adapter 320. The information that is copied over may include, among other data, the address and depths of each DMA queue 323 and 329, Quality of Service (QoS) attributes, state/connection tables, offload options, virtualization options and tables, statistics, and the like. Using the network addresses and other communication information established during setup of the network adapters 320, 330 as discussed above, the primary adapter 320 may transfer, such as via DMA operations, this information to the secondary adapter 330 over the IO bus 365.

It should be noted that while FIG. 3 illustrates the adapters 320 and 330 being associated with only one ingress buffer, egress buffer, ingress DMA queue, and egress DMA queue for simplicity of the description, each adapter 320, 330 may have multiple ingress/egress queues and buffers. Moreover, the number of queues and buffers associated with the adapters 320, 330 may not necessarily mirror each other in a 1:1 fashion. For example, in some implementations, there may be three ingress queues and five egress queues, as opposed to a strong mirroring requirement that would call for having three ingress queues and three egress queues for a particular example, although such strong mirroring requirements may also be used without departing from the spirit and scope of the illustrative embodiments. In short, any number of DMA queues and local buffers may be used with regard to each of the adapters 320, 330 without departing from the spirit and scope of the illustrative embodiments.

The information copied over to the secondary adapter 330 is used by the failover logic 332 of the secondary adapter 330 to set up the secondary adapter's local resources, e.g., local ingress buffer 334 and egress buffer 336, for access to ingress DMA queue 323 and egress DMA queue 329 in host memory 312, as well as any other necessary resources for taking over the operation of the primary adapter 320. These resources are configured to mirror the resources of the primary adapter 320 such that the resources on the secondary adapter 330 utilize similar address, depths, QoS parameters, and the like and are able to step in for the primary adapter 320 in response to notifying the host system 310 that the failover operation has been completed.

It should be appreciated that the DMA queues 323, 333, 329, and 339 exist in the host memory 312 for the entirety of the lifespan of the corresponding adapter 320, 330. Thus, when configuring the local resources in the secondary adapter 330, new DMA queues are not being created or old DMA queues being destroyed. To the contrary, the secondary adapter 330 is being informed of the location where the secondary adapter 330 may access the existing DMA queues 323, 329 associated with the primary adapter 320. The access of these DMA queues 323, 329 may be performed, from the adapter's perspective, via a bus address which is translated into a host memory address.

The local resources of the adapters 320, 330, e.g., local buffers or queues, are associated with corresponding ones of the DMA queues 323, 329, 333, and 339. These local resources, i.e. local ingress buffer 334 and local egress buffer 336 are the resources being set up (allocated) and configured in response to the copying over of the information from the primary adapter 320 to the secondary adapter 330.

The setup and configuring of the local resources on the secondary adapter 330 and in host memory 312 is performed without the intervention by the host system 310, e.g., the operating system executing on the host system 310. In order to setup the resources on the secondary adapter 330, the failover logic 332 of the secondary adapter 330 iterates through the information copied over to the secondary adapter 330 and uses this information to construct the secondary adapter 330 resource states and generate the various required local resources, e.g., ingress buffer 334 and egress buffer 336. This is essentially a priming of the secondary adapter 330 to take over for the primary adapter 320 should an actual failure of the primary adapter 320 occur or continued degradation of the primary adapter 320's performance is detected. This priming of the secondary adapter 320 allows for starting up the various functions on the secondary adapter 330 as quickly as possible in response to the detection of an imminent failure of the primary adapter 320. Through priming, the secondary adapter 330 local resources are setup with the correct state and configuration prior to actually having to use them as part of a failover operation.

After copying over the information needed to setup and configure the local resources, e.g., ingress buffer 334 and egress buffer 336 of the secondary adapter 330, the failover logic 322 of the primary adapter 320 pauses or temporarily disables the ingress traffic and no longer accepts data in the ingress buffer 324, e.g., a first-in-first-out (FIFO) buffer for ingress traffic data, from the physical ports or PHYs 327 and no longer pushes data from the ingress buffer 324 to the host memory 312 via DMA transactions. This pausing or temporarily disabling of the ingress traffic on the primary adapter 320 is performed without intervention by the host system 310. Because DMA operations are being used to transfer information from/to the adapters 320, 330, there is an assumption that DMA and the IO bus 365 are unrelated to the reason for the failover since, in all likelihood the connection between the ingress buffer 324 and PHY 327 is the source of the failure of the primary adapter 320. The pause of the ingress traffic data packets from being written to the host memory 312 is performed so that the failover logic 322 of the primary adapter 320 can calculate a cutover or failover position in the ingress DMA queue 323 and so that an overflow of the ingress buffer 324 is not encountered and data is not lost due to the overflow. The actual pausing or temporary disabling of the ingress traffic may be accomplished by transmitting a pause frame on the network 360 to the switch 362 coupling the primary adapter 320 and secondary adapter 330 to thereby inform the switch 362 to disable ingress traffic from the switch 362 to the port of PHY 327.

The failover logic 322 of the primary adapter 320 determines the size of the data currently stored in the ingress buffer 324 but not yet written to the host memory 312 to thereby calculate a skip position in the ingress DMA queue 323. As mentioned above, it is assumed that DMA transactions are operable and thus, data in the ingress buffer 324 does not need to be copied over to the ingress buffer 334 of the secondary adapter. However, if DMA transactions are not operable, then such copying may be performed in order to make sure that the data is available in the secondary adapter 330. With this assumption in mind, it is necessary to determine how many entries in the ingress DMA queue 323 have corresponding data already resident in the ingress buffer 324 and thus, will soon be written via DMA operations to the host memory 312. The calculation of the number of entries in the ingress DMA queue 323 that have data present in the ingress buffer 324, when added to the current position in the ingress DMA queue 323 will determine where in the ingress DMA queue 333, the secondary adapter 330 will begin writing ingress data rather than the primary adapter writing the ingress data. It should be appreciated that there may be more entries in the ingress DMA queue 323 than there is data available in the ingress buffer 324 and thus, not all DMAs in the ingress DMA queue 323 will necessarily be serviced by the primary adapter 320 and some, for which data is not present in the ingress buffer 324, may be instead serviced by the secondary adapter 330. The position in the ingress DMA queue 323 at which the secondary adapter 330 will take over the writing of data to the host memory 312 is referred to herein as the skip position with the entries between the current position in the ingress DMA queue 323 and the skip position being the skipped entries or skipped slots in the ingress DMA queue 323.

The failover logic 322 of the primary adapter 320 thereafter enables the DMA transactions between the ingress buffer 324 and the host memory 312 to continue, thereby draining the remaining ingress data in the ingress buffer 324. This continued processing of DMA transactions essentially consumes the skipped entries or slots in the ingress DMA queue 323. This is again done without intervention from the host system 310 with the intent being to minimize the cutover or failover time as much as possible. That is, by re-enabling the ingress DMA processing, data present in the ingress buffer 324 on the primary adapter 320 is written to the host memory 312 as if nothing has occurred. This may be accomplished by having the failover logic 322 re-enable an ingress DMA engine (not shown) of the primary adapter 320.

The result of the calculation of the skip position in the ingress DMA queue 323 is communicated to the secondary adapter 330. The secondary adapter 330 uses the skip position in the ingress DMA engine 323 to program the secondary adapter 330 with a current entry or position in the ingress DMA queue 333 corresponding to the skip position. The failover logic 322 of the primary adapter 320 and the failover logic 332 of the secondary adapter 330 perform their functions in this regard without intervention by the host system 310 with the failover logic 322 of the primary adapter 320 sending, by way of a DMA operation, the calculated skip position to the secondary adapter 330 and secondary adapter 330 receiving the skip position and programming its ingress DMA engine (not show) current entry with the calculated skip position (primary adapter 320 last start position+number of entries in the primary adapter's ingress buffer) as the current start position for placement of ingress data in the ingress DMA queue 333 by the secondary adapter 330. This is important so that the secondary adapter 330 knows where it can begin receiving data for DMA operations in the ingress DMA queue 333 such that it does not overwrite data being written by the primary adapter 320 while the primary adapter 320 is draining its ingress buffer 324.

The failover logic 332 of the secondary adapter 330 then enables its ingress DMA engine(s) and PHY but does not enable interrupts being generated by the secondary adapter 330 to the host system 310. This may be accomplished by the failover logic 332 of the secondary adapter 330 enabling its ingress local buffer 334 and port/PHY 337, with the port/PHY 337 sending an unpause frame to the switch 362 of the network 360.

The enabling of the ingress function on the secondary adapter 330 is done because it is desirable for failover of the processing of ingress traffic to be performed as quickly as possible while minimizing the time that adapters are offline. As a result, the amount of data that is lost and needs to be retransmitted by an upper level protocol (e.g., TCP retransmit) is also minimized. Thus, the illustrative embodiments start up the ingress function of the secondary adapter 330 while the primary adapter 320 is still draining its ingress buffer 324. Interrupts are not enabled in the secondary adapter 330 because it is undesirable at this time for the host system 310 to process ingress data from the secondary adapter 330 until the ingress buffer 324 of the primary adapter 320 is drained. This is to avoid a scenario where data comes in on the secondary adapter 330 while the ingress buffer 324 is being drained, an interrupt is generated by the secondary adapter 330, and the host system 310 processes data up to the point where the ingress buffer 324 is still draining its data and then stops because it has reached an invalid entry such that no more data is received on the secondary adapter 330 and an interrupt is not generated again. This scenario may occur in some implementations, whereas in other implementations this scenario may not occur since adapters may continuously generate interrupts if the adapter detects unanswered entries in their DMA queues.

It is at this point that ingress data is being received in the secondary adapter 330 and written to the host memory 312. The failover logic 322 of the primary adapter 320 determines if the ingress buffer 324 of the primary adapter 320 has been drained of ingress data. If not, the failover logic 322 waits until such a condition is encountered. This may be accomplished by monitoring the ingress buffer 324 to determine when the ingress buffer 324 is empty.

Thereafter, when the ingress buffer 324 of the primary adapter 320 is drained, interrupts on the secondary adapter 330 are enabled and an interrupt is generated by the failover logic 332 of the secondary adapter 330 if one has not already been generated. As with the other operations of the adapters 320 and 330, this operation is performed without intervention of the host system 310. This may be accomplished by having the failover logic 322 of the primary adapter 320 notify the secondary adapter 330 that the primary adapter 320 ingress buffer 324 is drained. Alternatively, the secondary adapter 330 monitors the ingress DMA queue 323 entry immediately before its own starting position in the ingress DMA queue 333, looking for its status bit to indicate that it is filled. Once it is determined that the primary adapter 320 ingress buffer 323 is drained, the secondary adapter 330 enables receive interrupts and generates one if needed. At this point, ingress data is now fully flowing to the host system 310 through the secondary adapter 330 and egress data may or may not be flowing through the primary adapter 320.

The failover logic 322 of the primary adapter 320 determines if egress data is flowing by evaluating completion counts maintained by the primary adapter 320. Increasing counts of completed egress DMA transactions indicate that egress data is still flowing through the primary adapter 320. The determination of whether egress data is still flowing through the primary adapter 320 is used hereafter to determine whether to stay in a current split handling mode of operation (where egress data is handled by the primary adapter 320 and ingress data is handled by the secondary adapter 330) or to complete the failover from the primary adapter 320 to the secondary adapter 330 such that the primary adapter 320 is taken offline. This determination may be performed by having the failover logic 322 of the primary adapter 320 monitor the egress completion queue and/or counters (not shown) of the primary adapter 320 to determine if they are steadily increasing or not.

If egress data is still flowing through the primary adapter 320 and the health of the primary adapter 320 is determined to be good, e.g., the performance of the primary adapter 320 is not continuing to degrade or is in fact improving, then operation in the split handling mode may continue until the primary adapter 320 no longer is in a good health state. In making such a determination, the failover logic 322 may periodically continue to monitor the performance characteristics of the primary adapter 320 and determine if the performance characteristics are even lower than the state of the performance characteristics when the failover operation priming was initiated. If so, then the health of the primary adapter 320 is not good and split handling mode may need to be exited. If the performance does not continue to degrade, or starts to improve, then the split handling mode may be continued.

If it is determined by the failover logic 322 that egress data is flowing through the primary adapter 320, egress DMA transactions may be paused on the primary adapter 320, i.e. reading from the host memory 312 to the egress buffer 326 may be paused. This operation is performed in concert with the host system 310 and is used to resolve the position in the egress DMA queue 329 of the primary adapter 320 as discussed hereafter, for cutover or failover to the secondary adapter 330. This may be accomplished by the failover logic 322 sending a pause frame to the host system 310 to inform the host system 310 to stop sending data and disable the egress DMA engine (not shown) of the primary adapter 320.

A current position in the egress DMA queue 329 (next entry after most current entry that was read into the egress buffer 326) is communicated to the secondary adapter 330. This current position is used by the secondary adapter 330 to program the current position into the secondary adapter 330 egress DMA queue 339 as the current position of the egress DMA queue 339.

Thereafter, the egress function on the secondary adapter 330 is enabled to begin reading in data to the egress buffer 336 but not yet send the data to the port/PHY 337. This is done without host system 310 interaction and is performed in an effort to minimize the transition from the primary adapter 320 to the secondary adapter 330, yet still try to allow for ordering of packets being sent to the network 360. This can be accomplished by enabling the egress DMA engine of the secondary adapter 330 so that it can begin reading in data from the egress DMA queue 339 to the egress buffer 336 while the primary adapter 320 is completing the transmission of data from its egress buffer 326.

The primary adapter 320 egress buffer 326 is drained of its data by sending the data to the port/PHY 327. The failover logic 322 of the primary adapter 320 monitors its egress buffer 326 and notifies the secondary adapter 330 when the draining of the egress buffer 326 is complete by posting a Done event to an event queue (EQ) 321. This may be done in parallel with the operations described above for pausing egress DMA transactions on the primary adapter, communicating the current position in the egress DMA queue to the secondary adapter, and enabling the egress function of the secondary adapter 330. The primary adapter 320 performs these operations without host system 310 interaction with the secondary adapter 330 acting as a recipient of a Done event posted to the event queue 321 and event queue 331 when the draining of the egress buffer 326 is complete. It is undesirable to have the secondary adapter 330 start sending data packets on the network 360 until the pervious data in the egress buffer 326 has been sent.

The egress port/PHY 337 functionality of the secondary adapter 330 is then enabled by the failover logic 332 of the secondary adapter 330 in response to receiving the Done event. The failover logic 332 of the secondary adapter also notifies the host system 310, such as by way of posting an event or generating an interrupt, that it may resume transmitting egress data. At this point, egress data is now flowing from the host system 310 through the secondary adapter 330. The host system 310 is then notified that the failover operation is complete by posting, by the failover logic 322 of the primary adapter 320, a corresponding event to the event queue 321 or generating an interrupt.

If egress data is not flowing through the primary adapter 320, then a backtrack offset in the egress DMA queue 329 is calculated relative to unsent data stored in the egress buffer 326. That is, in the event that the primary adapter 320 determines that its egress function is no longer making progress, the illustrative embodiments deal with the possibility that the primary adapter 320 has already read the data into its egress buffer 326 for the egress DMA queue 329 and advanced. It is possible to copy the data from the primary adapter 320 egress queue 326 to the egress queue 336 of the secondary adapter 330 but because the data is still resident and undisturbed in the egress DMA queue 329, the failover logic 322 of the primary adapter 320 may simply calculate a backtracked starting position and have the secondary adapter 330 begin its egress DMA transactions from that location in the egress DMA queue 339. Thus, the failover logic 322 of the primary adapter 320 determines the position in the egress DMA queue 329 where the secondary adapter 330 should start from by evaluating how much unsent data exists in the primary adapter 320 egress buffer 326. This may be accomplished by the failover logic 320 determining the number of DMA entries that have already had their corresponding data copied into the egress buffer 326. That number is circularly (to handle wrap cases) subtracted from the current position in the egress DMA queue 329 to determine the new backtrack offset.

The backtrack offset is then communicated to the failover logic 332 of the secondary adapter 330 which uses this backtrack offset to set a current position in the egress DMA queue 339 of the secondary adapter 330. In this way, the secondary adapter 330 is informed of the position in the egress DMA queue 329 from which it must begin reading data into its egress buffer 336 when its egress function is enabled. The egress function of the secondary adapter is then enabled by the failover logic 332. The host system 310 is then notified that the failover from the primary adapter to the secondary adapter 330 is complete by either posting an event to the event queue 321 or transmitting an interrupt.

Thus, the illustrative embodiments provide mechanisms for priming a secondary adapter to perform a failover operation from the primary adapter to the secondary adapter. The priming increases the speed at which the failover operation is performed and reduces the likelihood of data loss. The priming allows the secondary adapter to begin handling ingress traffic before the failover operation is complete and, in some cases, allows for a split handling of ingress and egress traffic if it is determined after initiating the failover operation that the primary adapter performance is not degrading further or that the failover has not occurred.

Figure 4A:
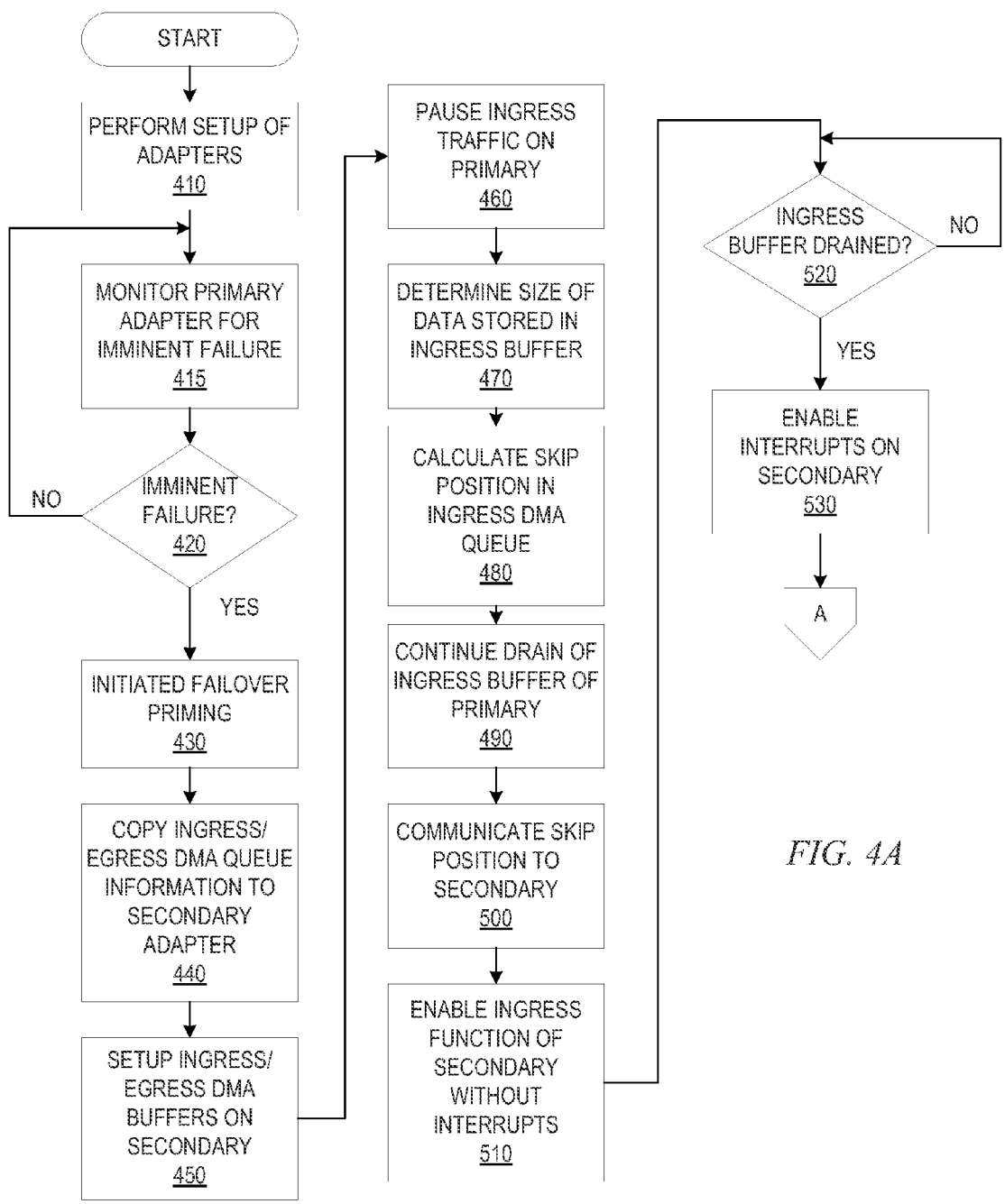
FIGS. 4A-4B illustrates a flowchart outlining an example operation for performing a failover priming and failover operation in accordance with one illustrative embodiment.
Figure 4B:
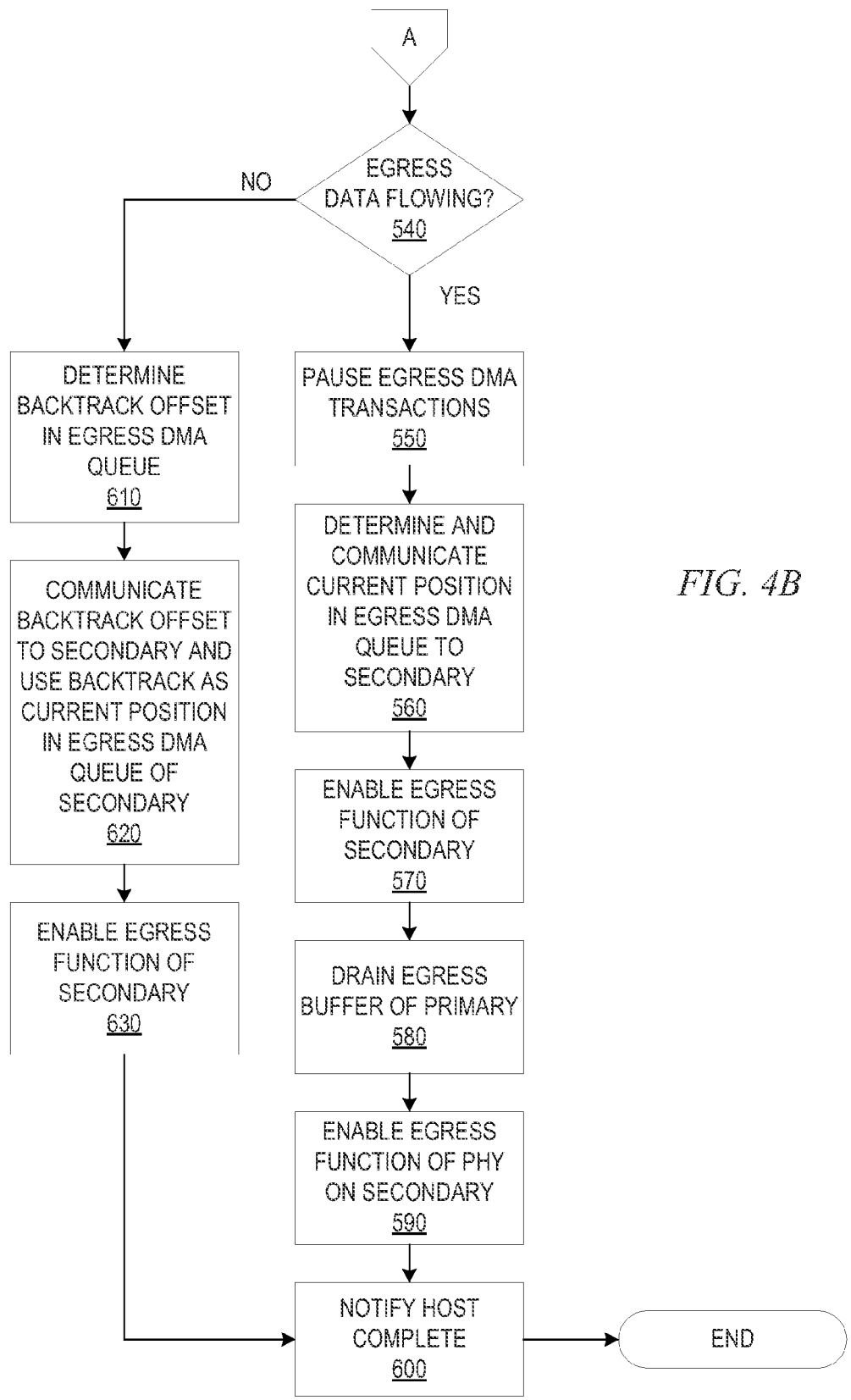

FIGS. 4A-4B illustrate a flowchart outlining an example failover priming operation and failover operation in accordance with one illustrative embodiment. As shown in FIG. 4A, the operation starts by performing a setup operation to exchange, between the primary adapter and secondary adapter, the communication connection information for the other adapter, e.g., network addresses, where to access the adapter on an IO bus via DMA, and/or the like (step 410). The operation then monitors the primary adapter (step 415) to determine if the primary adapter performance is indicative of an imminent failure (step 420). If not, the operation returns to step 420 and continues to monitor the primary adapter performance. If the performance of the primary adapter is indicative of an imminent failure, a failover priming operation is initiated (step 430).

The failover priming operation comprises copying over information of the primary adapter to the secondary adapter to construct a view of the ingress and egress DMA queues of the primary adapter on the secondary adapter (step 440). The copied over information is then used by the secondary adapter to setup its own local ingress and egress buffers to have a consistent state (e.g., address/length of the DMA queues associated with the primary adapter) as the ingress and egress buffers of the primary adapter (step 450). Ingress traffic processing on the primary adapter is then paused or temporarily disabled (step 460). The size of the data stored in the ingress buffer, but not yet written to host memory, is determined (step 470) and a skip position in the ingress DMA queue is calculated based on the size of the data stored in the ingress buffer (step 480). Meanwhile the ingress buffer of the primary adapter continues to drain ingress data to the host memory via DMA transactions (step 490). It should be appreciated that while FIG. 4A illustrates operation 490 being sequentially prior to operations 500 and 510 (described hereafter), the operation 490 may be performed in parallel with the operations 500 and 510.

The skip position for the ingress DMA queue is communicated to the secondary adapter and used to program its own local ingress DMA queue current position (step 500). The ingress function of the secondary adapter is then enabled without enabling interrupts (step 510).

A determination is then made as to whether the primary adapter ingress buffer is drained (step 520). If not, then the primary adapter waits until the ingress buffer is drained and returns to step 520. If the ingress buffer of the primary adapter is drained, interrupts on the secondary adapter are enabled and an interrupt is generated if not already done so (step 530).

Turning now to FIG. 4B, the primary adapter then determines if egress data is currently flowing through the primary adapter (step 540). If egress data is flowing through the primary adapter, egress DMA transactions are paused (step 550) and a current position in the egress DMA queue is communicated to the secondary adapter (step 560). The egress function of the secondary adapter is then enabled to begin reading in data to the egress buffer of the secondary adapter but not yet send on the port/PHY (step 570). The primary adapter egress buffer is drained by sending the data out on the port/PHY (step 580) and once drained the egress functionality of the port/PHY of the secondary adapter is enabled (step 590). The host system is then notified that the failover operation is complete (step 600).

If egress data is not currently flowing through the primary adapter (step 540), then a backtrack offset in the egress DMA queue relative to unset data stored in the egress buffer of the primary adapter is calculated (step 610). The backtrack offset is communicated to the secondary adapter which uses it as the current position for the egress DMA queue of the secondary adapter (step 620). The egress function of the secondary adapter is then enabled on the secondary adapter (step 630) and the host system is informed that the failover operation is completed (step 600).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a first adapter and second adapter, for performing a failover operation from the first adapter to the second adapter, the method comprising:

detecting that an imminent failure of the first adapter is likely to occur;
  initiating a failover priming operation in the first adapter and second adapter in response to detecting the imminent failure, wherein the failover priming operation configures ingress and egress buffers of the second adapter to have a similar configuration to ingress and egress buffers of the first adapter; and migrating processing of ingress data traffic to the second adapter prior to failure of the first adapter such that the first adapter processes egress data traffic from the data processing system and the second adapter processes ingress data traffic to the data processing system.

2. The method of claim 1, further comprising:
detecting an actual failure of the first adapter subsequent to detecting that the imminent failure of the first adapter is likely to occur; and
in response to detecting the actual failure of the first adapter, migrating processing of egress data traffic from the first adapter to the second adapter.

3. The method of claim 1, wherein initiating the failover priming operation comprises:
copying direct memory access (DMA) queue and buffer configuration and state information of the first adapter to the second adapter; and
configuring DMA queues and the ingress and egress buffers of the second adapter using the DMA queue and buffer configuration and state information of the first adapter.

4. The method of claim 1, wherein migrating processing of ingress data traffic to the second adapter prior to failure of the first adapter comprises:
pausing ingress data traffic processing on the first adapter;
calculating a size of data currently stored in an ingress buffer of the first adapter;
calculating a skip position in an ingress direct memory access (DMA) queue associated with the first adapter based on the size of data currently stored in the ingress buffer of the first adapter; and
communicating the skip position to the second adapter.

5. The method of claim 4, wherein migrating processing of ingress data traffic to the second adapter prior to failure of the first adapter further comprises:
re-enabling processing of data in the ingress buffer of the first adapter; and
processing data in the ingress buffer of the first adapter down to the calculated skip position to thereby drain the ingress buffer of the first adapter.

6. The method of claim 5, wherein migrating processing of the ingress data traffic to the second adapter further comprises:
programming an ingress DMA queue current position of an ingress DMA queue of the second adapter based on the skip position; and
enabling processing of ingress data traffic on the second adapter, wherein processing of the ingress data traffic on the second adapter starts at the ingress DMA queue current position.

7. The method of claim 6, wherein processing of the ingress data traffic on the second adapter is enabled without enabling interrupts on the second adapter, and wherein interrupts are enabled on the second adapter in response to the ingress buffer of the first adapter becoming empty.

8. The method of claim 7, further comprising enabling an ingress buffer and ingress physical port of the second adapter in response to enabling interrupts on the second adapter.

9. The method of claim 1, further comprising:
in response to migrating processing of the ingress data traffic to the second adapter, determining if egress data is flowing through the first adapter; and
in response to a determination that egress data traffic is not flowing through the first adapter, migrating processing of the egress data traffic from the first adapter to the second adapter.

10. The method of claim 1, further comprising:
determining whether a performance of the first adapter continues to deteriorate from a performance state when the imminent failure of the first adapter was detected; and
in response to determining that the performance of the first adapter continues to deteriorate:
pausing egress DMA transactions on the first adapter;
communicating a position in an egress DMA queue of the first adapter to the second adapter;
enabling an egress function of the second adapter to begin reading data at the position in the egress DMA queue of the first adapter;
draining the egress DMA queue of the first adapter; and
enabling egress data traffic processing by the second adapter in response to draining the egress DMA queue of the first adapter.

* * * * *